June 10, 1924.
F. KRIDER
1,497,101
GAUGE COCK OPERATING DEVICE FOR MOTOR VEHICLES
Filed May 12, 1922
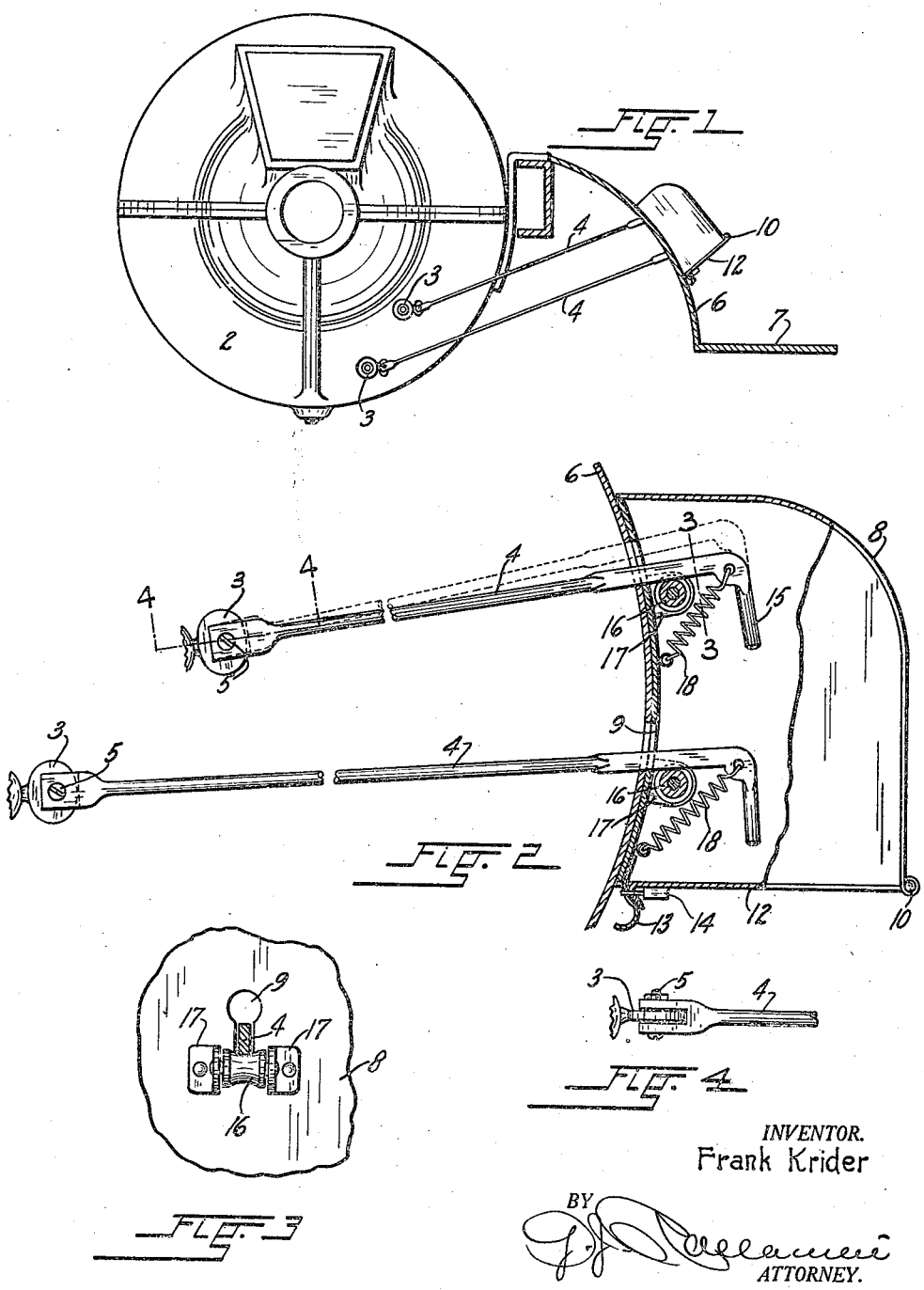
INVENTOR.
Frank Krider
BY
ATTORNEY.

Patented June 10, 1924.

1,497,101

UNITED STATES PATENT OFFICE.

FRANK KRIDER, OF DENVER, COLORADO.

GAUGE-COCK-OPERATING DEVICE FOR MOTOR VEHICLES.

Application filed May 12, 1922. Serial No. 560,500.

*To all whom it may concern:*

Be it known that I, FRANK KRIDER, a citizen of the United States, residing at Denver, in the county of Denver and State of Colorado, have invented certain new and useful Improvements in Gauge-Cock-Operating Devices for Motor Vehicles, of which the following is a specification.

My invention relates to certain new and useful improvements in means for operating gauge-cocks on the crank case of certain motor vehicles, from a point remote therefrom, and its principal object is to provide an efficient and simple arrangement of parts which permits of opening and closing either gauge-cock, from a readily accessible point at a side of the vehicle.

Another object of the invention is to provide in a device of the above described character, a casing which protects the operating parts thereof from dirt and moisture and prevents unauthorized access to the same; a further object of the invention is to so connect and support the operating means that the movements of the vehicle body on which the device is mounted, shall not affect the position of the gauge-cocks, and still other objects reside in details of construction and a novel arrangement of parts as will appear in the course of the following description made with reference to the accompanying drawings which illustrate an embodiment of the invention.

In the drawings in the several views of which like parts are similarly designated Figure 1 represents a vertical sectional elevation of a portion of a motor vehicle to which my invention is applied;

Figure 2, an enlarged sectional and fragmentary elevation of the invention and parts of the motor vehicle with which it is connected;

Figure 3, a section taken on the line 3—3, Figure 2, looking in the direction of the arrow drawn across said line; and Figure 4, a section on the line 4—4, Figure 2.

Referring to the drawings, the reference character 2 designates the motor of an automobile and 3 the pet cocks which are positioned at different elevations at an end thereof to determine the level of the oil contained in the crank case of the motor for the purpose of maintaining a supply sufficient for the constant lubrication of the cranks and other operating parts of the engine.

In order to open and close these pet cocks, it has heretofore been necessary to reach under the vehicle at considerable discomfort to the operator and the use of my invention makes it possible to perform the same operation from a readily accessible point at a side of the vehicle body.

The invention comprises with this end in view, two rods 4 which at one of their extremities are bifurcated to grasp the thumb pieces on the rotary members of the cocks. Screw-bolts 5 passing through alined apertures of the bifurcations and the thumb pieces of the cocks connect the parts against relative displacement.

The rods extend through slots in the mud guard 6 of the vehicle above the foot board 7 of the same, into a casing 8 which is formed to fit upon said guard, as shown in Figures 1 and 2 of the drawings.

The inner wall of the casing has slots 9 of key-hole shape through which the rods extend and its bottom portion 12 is hinged as at 10 to afford access to the rods for the operation of the valves.

A spring catch 13 on the casing holds the hinged bottom in its closed position and a lock may be applied to the door as shown at 14 in Figure 2, to prevent the rods from being manipulated by unauthorized persons.

The parts of the rods passing through the key-hole slots have been flattened to fit in the lower elongated portions thereof, and their extremities are bent at right angles to provide handles 15 which facilitate their manual rotation.

The rods are supported upon anti-friction rollers 16 which are mounted between brackets 17 on the inside of the casing beneath its slots, and coiled springs 18 extending between the ends of the rods and fastenings in the casing below the same, serve to yieldingly hold the rods in contact with the rollers. The rollers are concaved, as shown in Figure 3, to prevent lateral displacement of the rods, and the upper circular portions of the key-hole slots in the casing are of sufficient diameter to permit of free rotation of the rods when they are lifted out of the lower, narrow portions of the same.

When the pet-cocks on the crank case are in the closed position, the rods rest upon the rollers and are held in contact therewith by the springs 18. The rods in this position are held against accidental rotation in the slots of the crank case and their yielding connections with the relatively stationary parts of the vehicle body permit of a limited movement of the latter without affecting the position of the pet-cocks with which the rods engage.

To operate either pet-cock, the door at the lower end of the casing is opened and the respective rod is lifted until its flattened portion is in the circular end of the keyhole slot when by manipulation of its handle, the rod is turned until the cock connected with its opposite bifurcated end is open.

The cock is subsequently closed by reversed rotation of the rod and the spring automatically returns the rod to its original position in the lower portion of the slot after it is released.

Having thus described my invention, I desire to call particular attention to the fact that the springs not only prevent displacement of the rods while the vehicle is in motion, but also hold them against accidental rotation if, as might occur during excessive lateral movement of the vehicle body, they pass into the circular ends of the slots. The casing protects the ends of the rods and the springs from dirt and from being bent or broken, as might easily occur by reason of their proximity to the foot board of the vehicle, and it furthermore prevents children or mischievously inclined persons from turning the rods without reason and thereby causing waste of the oil in the crank case.

The concaved rollers upon which the rods are supported, not only facilitate the movement of the rods through the slots but also maintain the rods free from contact with the sides of the slots and thereby prevent wear of the thin metal of which the casing and the mud guard are composed. The rollers also eliminate noise by preventing the engagement of the parts when the vehicle is in motion, it being understood that the springs keep the rods in constant contact with the concaved surfaces.

What I claim and desire to secure by Letters Patent is:

1. Apparatus for the operation of a gauge-cock on the crank case on a motor vehicle, comprising in combination with a part of the vehicle body, having a key-hole slot, a rod in rotative engagement with the gauge-cock and projecting through the slot, a roller supporting the rod in a position in which it extends in the lower portion of the slot, and a spring adapted to yieldingly hold the rod in contact with the roller.

2. Apparatus for the operation of a gauge-cock on the crank case of a motor vehicle, comprising in combination with the slotted mud guard above the foot board of the vehicle, a plate fastened exteriorly said mud guard and having a key-hole slot in register with the slot thereof, a rod in rotative engagement with the gauge-cock and projecting through the slots, a roller on the plate supporting the rod in a position in which it extends in the lower portion of the slots, and a spring acting upon the rod to normally maintain it in engagement with the roller.

3. Apparatus for the operation of a gauge-cock of the crank case of a motor vehicle comprising in combination with a slotted mud guard above the foot board of the vehicle, a casing fastened exteriorly of said mud guard and having a key-hole slot in register with the slot thereof, a rod in rotative engagement with the gauge-cock and projecting through the slots, a spring acting upon the rod to normally maintain it in place in the lower portion of the slot, and a door in the bottom of the casing affording access to the rods.

In testimony whereof I have affixed my signature.

FRANK KRIDER.